US008775527B2

(12) United States Patent
O'Sullivan et al.

(10) Patent No.: US 8,775,527 B2
(45) Date of Patent: Jul. 8, 2014

(54) COLLABORATIVE EMAIL FILTERING

(75) Inventors: Patrick Joseph O'Sullivan, Ballsbridge (IE); Sean Callanan, Churchtown (IE); Hema Srikanth, Raleigh, NC (US); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 12/335,050

(22) Filed: Dec. 15, 2008

(65) Prior Publication Data
US 2010/0153500 A1 Jun. 17, 2010

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| 6,523,012 | B1 | 2/2003 | Glassman et al. |
| 7,293,013 | B1 * | 11/2007 | Horvitz et al. ................. 707/694 |
| 2004/0034774 | A1 | 2/2004 | Le Saint |
| 2004/0039786 | A1 * | 2/2004 | Horvitz et al. ................. 709/207 |
| 2004/0073530 | A1 | 4/2004 | Stringer-Calvert et al. |
| 2004/0073801 | A1 | 4/2004 | Kalogridis et al. |
| 2005/0033813 | A1 | 2/2005 | Bhogal et al. |
| 2006/0047766 | A1 | 3/2006 | Spadea, III |
| 2006/0053203 | A1 * | 3/2006 | Mijatovic ...................... 709/206 |
| 2006/0224750 | A1 * | 10/2006 | Davies et al. .................. 709/229 |
| 2008/0043942 | A1 * | 2/2008 | Cardona et al. ............ 379/88.18 |
| 2008/0071873 | A1 | 3/2008 | Gross |
| 2008/0103877 | A1 | 5/2008 | Gerken |

FOREIGN PATENT DOCUMENTS

EP 1 411 430 A2 4/2004
WO 2007/002226 A1 1/2007

* cited by examiner

*Primary Examiner* — Shripal Khajuria
(74) *Attorney, Agent, or Firm* — Holland & Knight LLP; Brian J. Colandreo, Esq.; Jeffrey T. Placker, Esq.

(57) ABSTRACT

A first filter input is received from a first recipient of an email including a plurality of recipients. The first filter input is associated with the email. Further, the first filter input is propagated to at least another of the plurality of recipients of the email.

20 Claims, 5 Drawing Sheets

COLLABORATIVE EMAIL FILTERING

TECHNICAL FIELD

The present disclosure generally relates to email systems, and more particularly relates to collaborative filtering of email by email recipients.

BACKGROUND

Often many people within a defined group or organization may each receive a common email. For example, the email may be spam or other junk email that may be generally directed at a specific domain. Similarly, every individual may be copied on a group-wide or department wide email. Frequently, such mass-emails may be of little value, being addressed to a large number of recipients, rather than targeted to a few specific individuals to whom the email may actually pertain. However, each individual recipient must open the email and at least quickly scan the email to determine if the email is of any value to the individual recipient. Once an individual recipient has read or scanned the email, he/she may take a desired action, such as deleting the email, responding to the email, etc. Any such action must be carried out with little or no initial information regarding the email, such as a relative importance, likelihood that the email is junk-mail, etc.

SUMMARY

According to one implementation a method includes receiving a first filter input from a first recipient of an email including a plurality of recipients. The first filter input is associated with the email. The first filter input is further propagated to at least another of the plurality of recipients of the email.

One or more of the following features may be included. The first filter input may be indicative of a perceived importance of the email. The email may be modified based upon, at least in part, the first filter input. Modifying the email may include providing an indicator of perceived importance of the email. Further, modifying the email based upon, at least in part, the first filter input may include modifying the email based upon a status of the first recipient. Additionally, modifying the email based upon, at least in part, the first filter input may include modifying the email based upon one or more rules defined for at least another of the plurality of recipients.

The method may also include receiving a second filter input from a second recipient of the email. The second filter input may be associated with the email. The second filter input may be propagated to at least another of the plurality of recipients of the email. The first filter input and the second filter input may be aggregated.

According to another implementation, a computer program product includes a computer readable medium having a plurality of instructions stored on it. When executed by a processor, the instructions cause the processor to perform operations, including receiving a first filter input from a first recipient of an email including a plurality of recipients. The first filter input is associated with the email. The first filter input is propagated to at least another of the plurality of recipients of the email.

One or more of the following features may be included. The first filter input may be indicative of a perceived importance of the email. Instructions may be included for modifying the email based upon, at least in part, the first filter input. The instructions for modifying the email include instructions for providing an indicator of perceived importance of the email. The instructions for modifying the email based upon, at least in part, the first filter input further may include instructions for modifying the email based upon a status of the first recipient. The instructions for modifying the email based upon, at least in part, the first filter input may further include instructions for modifying the email based upon one or more rules defined for at least another of the plurality of recipients.

The computer program product may further include instructions for receiving a second filter input from a second recipient of the email. The second filter input may be associated with the email. The second filter input may be propagated to at least another of the plurality of recipients of the email. The first filter input and the second filter input may be aggregated.

According to yet another implementation, a computing system includes a processor and a memory architecture coupled with the processor. A first software module is executable by the processor and the memory architecture. The first software module is configured to receive a first filter input from a first recipient of an email including a plurality of recipients. A second software module is also executable by the processor and the memory architecture. The second software module is configured to associate the first filter input with the email. A third software module is also executable by the processor and the memory architecture. The third software module is configured to propagate the first filter input to at least another of the plurality of recipients of the email.

One or more of the following features may be included. The first filter input may be indicative of a perceived importance of the email. A fourth software module may be included, in which the fourth software module may be executable by the processor and the memory architecture. The fourth software module may be configured to modify the email based upon, at least in part, the first filter input. The fourth software module, which may be configured to modify the email based upon, at least in part, the first filter input, may further be configured to modify the email based upon a status of the first recipient. The fourth software module, which may be configured to modify the email based upon, at least in part, the first filter input, may be further configured to modify the email based upon one or more rules defined for at least another of the plurality of recipients.

The computing system may also include a fifth software module that may be executable by the processor and the memory architecture. The fifth software module may be configured to receive a second filter input from a second recipient of the email. A sixth software module may be executable by the processor and the memory architecture. The sixth software module may be configured to associate the second filter input with the email. A seventh software module may be executable by the processor and the memory architecture. The seventh software module may be configured to propagate the second filter input to at least another of the plurality of recipients of the email. An eighth software module may be executable by the processor and the memory architecture. The eighth software module may be configured to aggregate the first filter input and the second filter input.

The details of one or more implementations are set forth in the accompanying drawings and the description below. Other features and advantages will become apparent from the description, the drawings, and the claims.

DETAILED DESCRIPTION OF EXEMPLARY EMBODIMENTS

Figure 1:
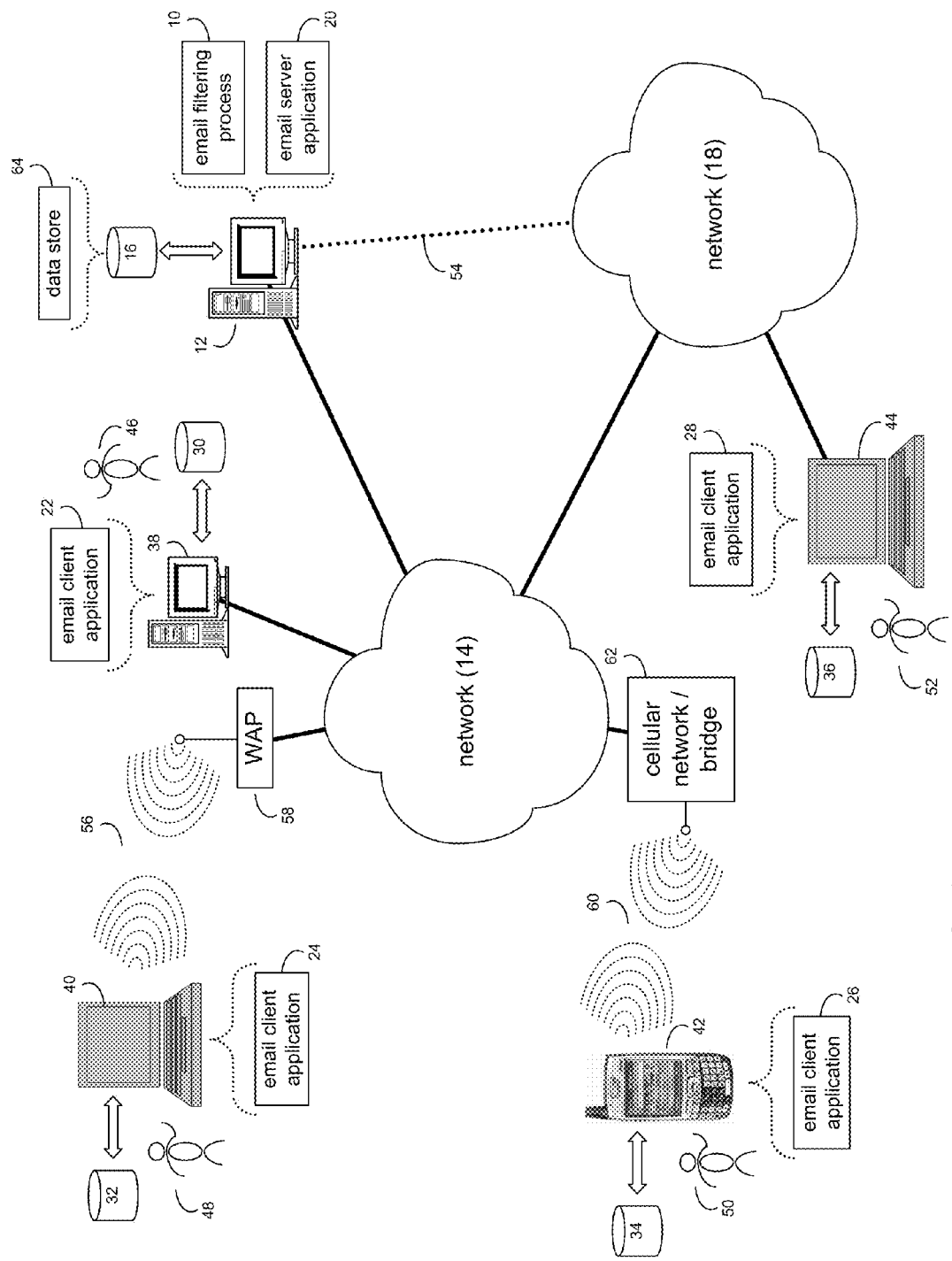
FIG. 1 diagrammatically depicts an email filtering process and an email application coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable medium may be, for example but not limited to, an electronic, magnetic, optical, electromagnetic, infrared, or semiconductor system, apparatus, device, or propagation medium. Examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown email filtering process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

As will be discussed below in greater detail, email filtering process 10 may receive a first filter input from a first recipient of an email including a plurality of recipients. The first filter input may be associated with the email. The first filter input may further be propagated to at least another of the plurality of recipients of the email.

The instruction sets and subroutines of email filtering process 10, which may be configured as one or more software modules, and which may be stored on storage device 16 coupled to server computer 12, may be executed by one or more processors (not shown) and one or more memory architectures (not shown) incorporated into server computer 12.

Storage device 16 may include but is not limited to: a hard disk drive; a solid state drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute email server application 20, examples of which may include but are not limited to Lotus Domino® Server and Microsoft Exchange Server® (Domino is a trademark of International Business Machines Corporation in the United States, other countries, or both; and Microsoft Exchange Server is a registered trademark of Microsoft Corporation in the United States, other countries, or both). Email server application 20 may be a messaging and collaboration software platform that may allow for user collaboration via email client applications 22, 24, 26, 28, examples of which may include but are not limited to Lotus Notes® and Microsoft Outlook® (Lotus Notes is a trademark of International Business Machines Corporation in the United States, other countries, or both; and Outlook is a registered trademark of Microsoft Corporation in the United States, other countries, or both). Email filtering process 10 may be a stand alone application that interfaces with email server application 20 or an applet/application that is executed within email server application 20.

The instruction sets and subroutines of email server application 20, which may be configured as one or more software modules, and which may be stored on storage device 16 coupled to server computer 12, may be executed by one or more processors (not shown) and one or more memory architectures (not shown) incorporated into server computer 12.

While the email filtering process is shown and described as residing on, and being executed by, server computer 12, other implementations may equally be utilized. For example, the email filtering process may be a client-side process stored on one or more storage devices (e.g., storage devices 30, 32, 34, 36) coupled to one or more client electronic devices (e.g., client electronic devices 38, 40, 42, 44; respectively). In such an implementation, the email filtering process may be a stand alone application that interfaces with an email client application (e.g., one or more of email client application 22, 24, 26, 28) or an applet/application that is executed within an email client application. As such, the email filtering process may be a server-side process executed on server computer 12, a client-side process executed by one or more client electronic device (e.g., one or more of client electronic devices 38, 40, 42, 44), or a hybrid client-side/server-side process, executed in part by server computer 12 and one or more client electronic device (e.g., one or more of client electronic devices 38, 40, 42, 44).

The instruction sets and subroutines of email client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may allow users to e.g., created, receive, and manage email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft® Windows®, Microsoft Windows CE®, Red Hat® Linux®, or a custom operating system (Windows CE is a registered trademark of Microsoft Corporation in the United States, other countries, or both).

Figure 2:
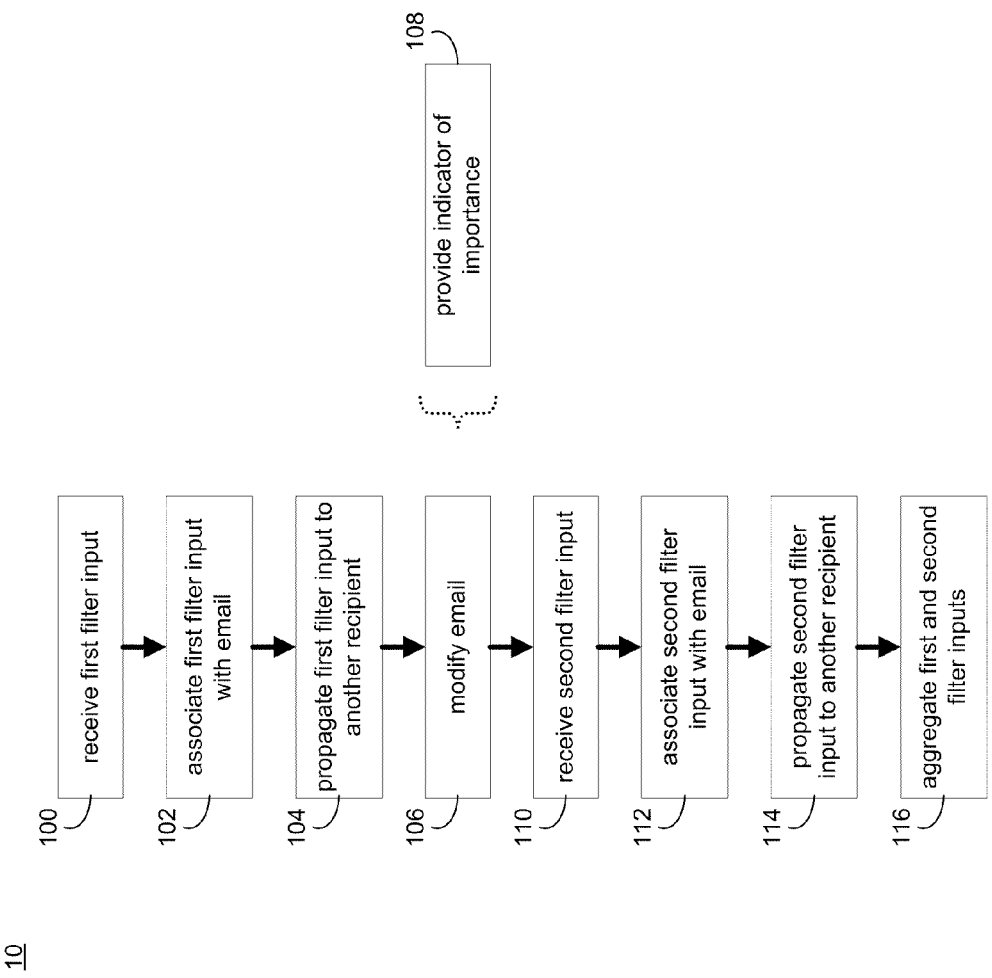
FIG. 2 is a flowchart of a process executed by the email filtering process of FIG. 1.

Referring also to FIG. 2, email filtering process 10 may generally receive 100 a first filter input from a first recipient of an email that includes a plurality of recipients. The first filter input may be associated 102 with the email. Further, the first filter input may be propagated 104 to at least another of the plurality of recipients of the email.

Figure 3:
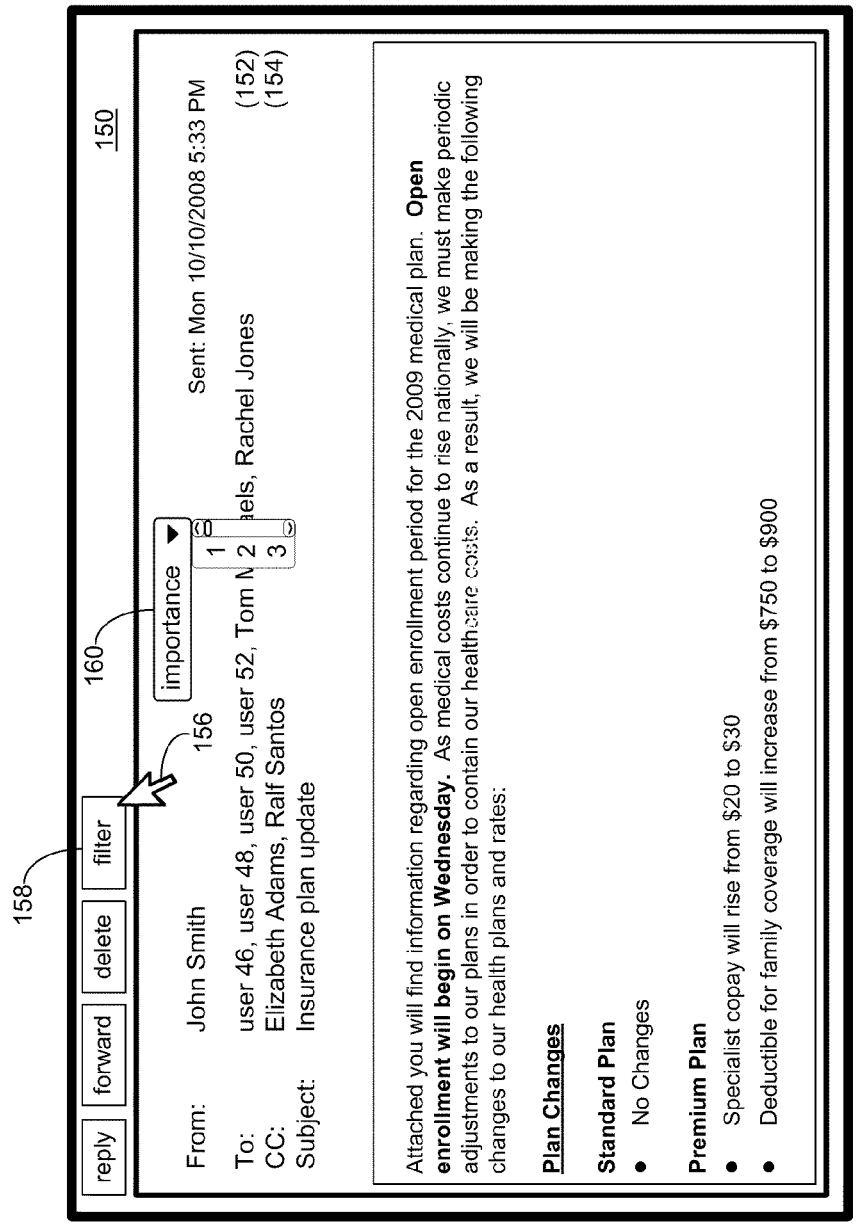
FIG. 3 diagrammatically depicts an email user interface rendered by the email filtering process and/or the email application of FIG. 1.

For example, and referring also to FIG. 3, user 46 may receive email 150, via email client application 22. Email 150 may be addressed to a plurality of recipients (i.e., user 46, user 48, user 50, user 52, Tom Michaels, and Rachel Jones in "To"

field 152 and Elizabeth Adams and Ralf Santos in "CC" field 154). Email 150 may include any variety of multi-recipient email.

Continuing with the above example, email filtering process 10 may allow user 46 to provide a first filter input relative to email 150. The first filter input may allow user 46 to provide a qualitative assessment or characterization of email 150, such as a rating of the importance of the email, a characterization of the email as spam or junk email, etc. For example, user 46 may select, via onscreen pointer 156 (which may be controlled by a pointing device such as a mouse, not shown), filter button 158.

As mentioned above, the first filter input may be indicative of a perceived importance of the email. Selecting filter button 158 may result in email filtering process 10 (alone or in conjunction with one or more of email client application 22 and email server application 20) rendering menu 160. While menu 160 is shown including numerical values (e.g., which may range from 1 through 10) that may be indicative of a perceived importance of the email 150, this should not be construed as a limitation of the present disclosure as various other mechanisms may be used for quantifying a perceived importance of the email (e.g., discreet options such as "low", "medium", and "high" or "important", "not important", and "spam", graphical displays such as color coded icons, and the like).

User 46 may select, via onscreen pointer 156, a value corresponding to user 46's perception of the importance of email 150 from menu 160. For example, assume that user 46 selects an importance value of "1", indicating that user 46 perceives email 150 to have a very low importance. Email filtering process 10 may receive 100 the first filter input (i.e., an importance value of "1") from user 46 and/or from email client application 22. Email filtering process 10 may associate 102 the first filter input with email 150.

According to one implementation, associating 102 the first filter input received 100 from user 46 may include storing the first filter input and a reference to email 150 in a central repository (e.g., data store 64 residing on storage device 16 of server computer 12), e.g., which may include a database or other suitable data store. For example, email filtering process 10 may store the received 100 first filter input from user 46 in data store 64 along with a reference to email 150, e.g., thereby providing an association between the first filter input (i.e., a perceived importance value of "1") and email 150. Additionally, information, such as the identity and/or characteristics of the user from whom the first filter input is received 100 (e.g., user 46), when the first filter input was received, etc., may also be stored in data store 64, and may be associated with email 150. Email filtering process 10 (alone and/or in conjunction with one or more of email client application 22 and/or email server application 20) may push the first filter input (e.g., and also any additional information to be stored) to data store 64.

According to another embodiment, email filtering process 10 may directly associate 102 the received 100 first filter input with email 150. For example, email filtering process 10 may embed the first filter input (e.g., the perceived importance value of "1", in the above example) as an attribute of email 150. According to one embodiment, the first filter input may be embedded into email 150 as an x-header (e.g., a definable header field). Of course, this should not be construed as a limitation of this disclosure, as the first filter input may be otherwise associated 102 with email 150.

The first filter input may be propagated 104 to at least another of the plurality of recipients of the email. For example, upon the first filter input being associated 102 with email 150 via email client application 22 (or at some time there-after), email filtering process 10 (alone, or in conjunction with email server application 20 and/or one or more email client application 22, 24, 26, 28) may propagate 104 the first filter input to one or more of the other recipients (e.g., via respective email client applications 24, 26, 28).

As described above, in one embodiment, the first filter input may be stored in a central repository (e.g., data store 64). Based upon, at least in part, a recipient list for email 150 (e.g., which may be represented by "To" filed 152 and "CC" field 154, as well as any other recipient fields of email 150; not shown), email filtering process 10 may propagate 104 the first filter input to one or more of the other recipients (e.g., via respective email client applications 24, 26, 28). For example, email filtering process 10 may propagate 104 the first filter input to at least another of the plurality of recipients of email 150, e.g., by pushing the first filter input to one or more email client application associated with another of the plurality of recipients.

Additionally/alternatively, upon another recipient subsequently (i.e., after the first filter input has been associated 102 with email 150) viewing email 150 (e.g., via a respective email client application), email filtering process 10 (alone or in conjunction with email server application 20 and/or a respective email client application 22, 24, 26, 28) may query the central repository (e.g., data store 64) relative to any filter inputs associated with email 150. In the event that first filter input has been associated 102 with email 150 (as described above), as reflected by a data entry in data store 64, email filtering process 10 (alone or in conjunction with email server application 20 and/or the respective email client application 22, 24, 26, 28) may propagate 104 (e.g., push to the respective email client application and/or retrieve the first filter input from data store 64) the first filter input to at least another of the recipients of email 150 (e.g., via a respective email client application).

As also described above, the first filter input may be associated 102 directly with email 150. In one embodiment, email filtering process 10 may propagate 104 the first filter input to at least another of the recipients of email 150 by sending an update to email 150 to at least another of the recipients of email 150 (e.g., based upon the other recipients indicated in "To" filed 152 and "CC" field 154, and/or any additional recipient fields of email 150). Sending an update to email 150 may include sending a copy of email 150 including the associated 102 first filter input to at least another of the recipients of email 150. For example, the copy of email 150 including the associated 102 first filter input may include a copy of email 150 having the first filter input embedded as an x-header field. Upon receipt by the other recipients, email filtering process 10 and/or a respective email client application of the other recipients may replace the originally received copy of email 150 with the updated copy of email 150 including the associated 102 first filter input.

The email may be modified 106 based upon, at least in part, the first filter input. As described above, the first filter input may provide a qualitative assessment or characterization of email 150. Email filtering process 10 may modify 106 email 106 to include an indicator of the qualitative assessment or characterization of email 150 received 100 from the first user (e.g., user 46) as the first filter input. In an embodiment in which the first filter input may be stored in data store 64, email filtering process 10 (alone an/or in conjunction with email server application 20 and/or a respective email client application 22, 24, 26, 28) may modify 106 email 150 in response to receiving/retrieving the first filter input from data store 64. Further, consistent with the foregoing description in which the first filter input may be directly associated with email 150, modifying 106 email 150 may include replacing an originally received copy of email 150 with an updated copy of email 150 (e.g., which may include the first filter input directly associated 102 with the updated copy of email 150).

Figure 4:
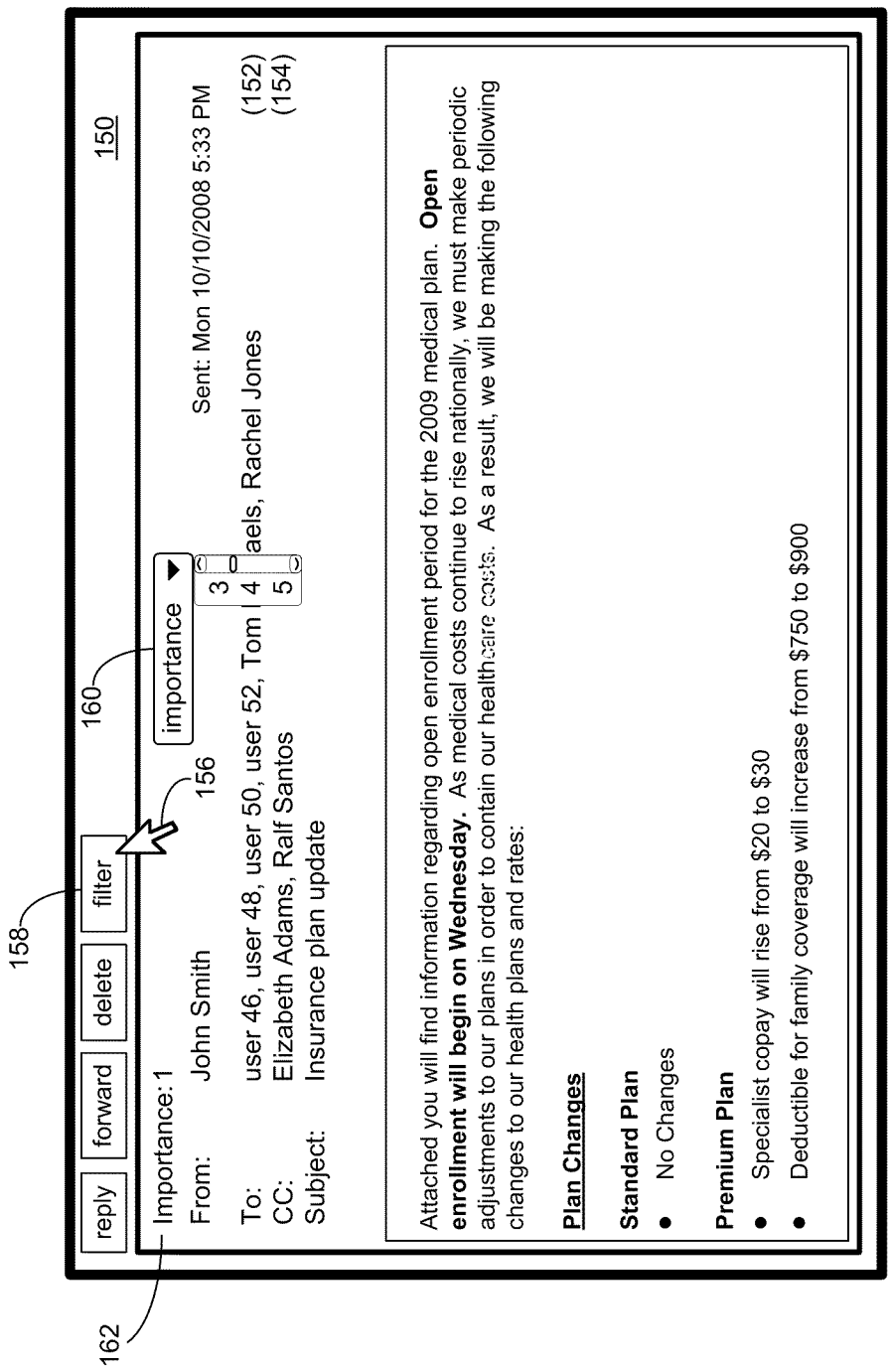
FIG. 4 diagrammatically depicts an email user interface rendered by the email filtering process and/or the email application of FIG. 1.

Modifying 106 the email may include providing 108 an indicator of perceived importance of the email. Continuing with the above-stated example, an importance value of "1" may have been associated 102 with email 150 by user 46. Referring also to FIG. 4, via email client application 24, user 48 may view email 150 (i.e., a copy of the email that was commonly addressed to the plurality of users, also including user 46) including the propagated 104 first filter input. As shown, email filtering process 10 (alone or in conjunction with one or more of email server application 20 and/or email client application 24) may modify 106 email 150 to provide 108 indicator 162 of perceived importance (namely "Importance: 1"). While a text/numerical indicator is shown in the depicted embodiment, this should not be construed as a limitation on this disclosure, as other indicators (e.g., icon-based indicator, color coding, etc.) may suitably be employed.

Modifying 106 the email based upon, at least in part, the first filter input may include modifying 106 the email based upon a status of the first recipient. Continuing with the above-stated example, the first recipient (e.g., user 46) may, for example, be a supervisor of a department of an organization, such as a corporation, agency, or the like. User 46's status as a supervisor of a department of an organization may, for example, be discerned based upon, at least in part, reference to an organizational structure, job title, seniority, or other attribute, e.g., which may be included within an organizational directory (such as a corporate LDAP directory), user attributes, or the like which may be accessible by email filtering process 10.

Still continuing with the above-stated example in which user 46 may perceive email 150 to be of relatively low importance. Based upon, at least in part, the first filter input received 100 from user 46, associated 102 with email 150, and propagated 104 to at least another recipient of email 150, and based upon, at least in part user 46's status, email filtering process 10 may modify 106 email 150 to prevent the other recipients (e.g., user 48) from forwarding email 150. Further, email filtering process 10 may, based upon user 46's status as a supervisor and user 46's perception of the low importance of email 150, disallow at least another of the recipients from reading email 150 (e.g., which may include deleting email 150 from the other recipients' inbox).

In a related manner, user 46 may, for example, perceive the email to be of relatively high importance. As such, user 46 may wish to motivate at least subordinate recipients (e.g., those recipients with respect to whom user 46 may be a supervisor) to read and/or prioritize the email. Accordingly, user 46 may provide a first filter input indicative of the perceived importance of the email (e.g., and email filtering process 10 may receive 100 the first filter input indicative of a relatively high importance, may associate 102 the first filter input with the email, and may propagate 104 the first filter input to at least another recipient of the email). Further, email filtering process 10 may modify 106 the email in a manner that may motivate at least another of the recipients to read the email. For example, email filtering process 10 may modify 106 the email to include an indicator of high importance, to prioritize the email within the other recipients' respective inboxes, or to prevent other email from being accessed until the email has been opened. Of course, the email may otherwise be modified to motivate recipients to read the email depending upon design criteria, system configuration, and/or user preference.

Additionally, modifying 106 the email based upon, at least in part, the first filter input may include modifying 106 the email based upon one or more rules defined for at least another of the plurality of recipients. The one or more rules may be defined for specific individuals/groups of individuals and/or may be defined system-wide (e.g., may apply to all users of the system). Such rules may be defined by an administrator, by and individual user or the like. Various user interfaces and selection options may be utilized. For example, a user may disable collaborative email filtering. In such an embodiment, an email received by the user may not be modified 106 based upon a filter input associated with the email. In a related manner, email filtering process 10 may allow a rule to be defined for a user such that the email may only be modified 106 based upon filter inputs received from specific individuals/groups of individuals (e.g., the user's supervisor, direct co-workers, or the like).

In addition/as an alternative to rules relating to when/whether an email may be modified 106, one or more rules may be defined influencing how the email may be modified 106. For example, a rule may be defined such that if an importance score is sufficiently low (e.g., below a predetermined threshold value), email filtering process 10 (alone or in conjunction with one or more of email server application 20 and/or a respective email client application 22, 24, 26, 28) may modify 106 the email to automatically delete/quarantine the email. In a related manner, a rule may be defined such that is an importance score is sufficiently high (e.g., above a predetermined threshold value), email filtering process 10 (alone or in conjunction with one or more of email server application 20 and/or a respective email client application 22, 24, 26, 28) may modify 106 the email by prioritizing the email (e.g., providing a visual indicator of importance, preventing other emails from being opened until the modified 106 email has been read, etc.).

Additional benefits of collaborative email filtering may be realized if additional recipients provide filter inputs. In this regard, email filtering process 10 may receive 110 a second filter input from a second recipient of the email. The second filter input may be associated 112 with the email and may be propagated 114 to at least another of the plurality of email recipients. Further, the first filter input and the second filter input may be aggregated 116. Continuing with the above-stated example, and still referring to FIG. 4, user 48 may select, via onscreen pointer 156, filter button 158. Selecting filter button 158 may result in email filtering process (alone or in conjunction with email client application 24) rendering menu 160. User 48 may select, from menu 160, a value corresponding to user 48's perceived importance of email 150. For example, user 48 may perceive email 150 to be moderately important. As such, user 48 may select an importance value of "5".

In response to user 48 selecting an importance value of "5", email filtering process 10 may receive 110 the second filter input (e.g., an importance value of "5") from user 48 (e.g., via email client application 24). Email filtering process 10 may associate 112 the second filter input with email 150, in a manner that may generally correspond to the above-described associating 102 of first filter input with email 150. Similarly, email filtering process 10 may propagate 114 the second filter input to at least another recipient of email 150 (e.g., user 46, user 50, user 52, Tom Michaels, Rachel Jones, Elizabeth Adams, and Ralf Santos), in a manner that may generally correspond to the above-described propagation 104 of first filter input.

Figure 5:
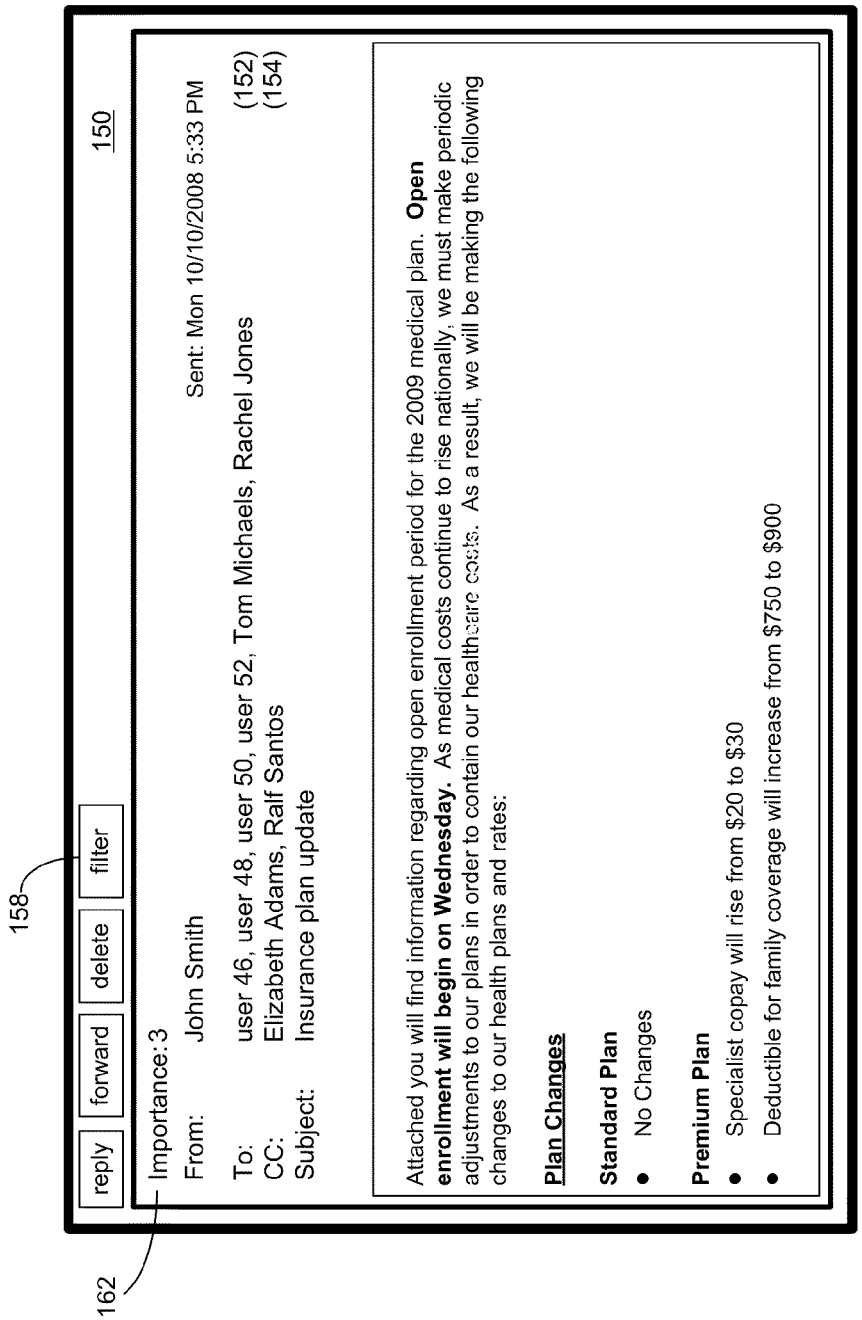
FIG. 5 diagrammatically depicts an email user interface rendered by the email filtering process and/or the email application of FIG. 1.

Email filtering process 10 may aggregate 116 the first filter input and the second filter input. For example, and referring also to FIG. 5, user 50 (another of the recipients of email 150) may view email 150 after the first and second filter inputs have been propagated 104, 114. Email filtering process 10 may aggregate 116 the first and second filter input, for example to achieve an average importance rating of "3" (i.e., the average of first filter input "1" and second filter input "5"). Email filtering process 10 may aggregate filter elements whenever a new filter element is propagated and/or upon a recipient accessing the email.

While the foregoing description has generally related to filter inputs indicative of a perceived importance of the email, which may be provided as a numerical quantity, as discussed above, such aspects are intended only for illustrative purposes, and should not be construed as limitations of the present disclosure as other implementations will be readily understood. For example, the filter inputs may be based on characteristics of the email other than a perceived importance. Similarly, even in an embodiment in which the filter inputs may be indicative of a perceived importance, filter inputs other than numerical quantities may be utilized.

A number of implementations have been described. Nevertheless, it will be understood that various modifications may be made. Accordingly, other implementations are within the scope of the following claims.

What is claimed is:

1. A method comprising:
   receiving, at a computer device, a first filter input from a first recipient of a received email including a plurality of recipients, the first filter input corresponding to the received email;
   associating the first filter input with the received email, wherein the first filter input includes a characterization of the received email;
   propagating the characterization of the received email of the first filter input to at least another of the plurality of recipients of the received email;
   modifying the received email based upon, at least in part, the first filter input, including embedding the first filter input within a header of the modified received email;
   receiving, at a computer device, a second filter input from a second recipient of the received email; and
   aggregating the first filter input and the second filter input.

2. The method of claim 1, wherein the characterization of the received email of the first filter input is indicative of a perceived importance of the received email.

3. The method of claim 1, wherein modifying the received email includes providing an indicator of perceived importance of the received email.

4. The method of claim 1, wherein modifying the received email based upon, at least in part, the first filter input further comprises at least one of:
   modifying the received email based upon a status of the first recipient; and
   modifying the received email based upon one or more rules defined for the at least another of the plurality of recipients.

5. The method of claim 4, wherein the status of the first recipient is based upon, at least in part, a position of the first recipient in an organization.

6. The method of claim 1 further comprising:
   associating the second filter input with the received email;
   propagating the second filter input to the at least another of the plurality of recipients of the received email; and
   embedding the aggregated first and second filter inputs within the header of the modified received email.

7. The method of claim 1, further comprising:
   allowing, via a graphical user interface, the first recipient of the received email to select the first filter input.

8. The method of claim 7, wherein the received email is viewable through the graphical user interface and wherein the first filter input is selectable via a menu available from the graphical user interface.

9. The method of claim 1, further comprising:
   preventing other emails from being accessed within an inbox associated with each of the plurality of recipients until the modified received email has been opened.

10. A computer program product comprising a non-transitory computer readable medium having a plurality of instructions stored thereon, which, when executed by a processor, cause the processor to perform operations comprising:
    receiving a first filter input from a first recipient of a received email including a plurality of recipients, the first filter input corresponding to the received email;
    associating the first filter input with the received email, wherein the first filter input includes a characterization of the received email;
    propagating the characterization of the received email of the first filter input to at least another of the plurality of recipients of the received email;
    modifying the received email based upon, at least in part, the first filter input, including embedding the first filter input within a header of the modified received email;
    receiving, at a computer device, a second filter input from a second recipient of the received email; and
    aggregating the first filter input and the second filter input.

11. The computer program product of claim 10, wherein the characterization of the received email of the first filter input is indicative of a perceived importance of the received email.

12. The computer program product of claim 10, wherein the instructions for modifying the received email include instructions for providing an indicator of perceived importance of the received email.

13. The computer program product of claim 10, wherein the instructions for modifying the received email based upon, at least in part, the first filter input further comprise instructions for at least one of:
    modifying the received email based upon a status of the first recipient; and
    modifying the received email based upon one or more rules defined for the at least another of the plurality of recipients.

14. The computer program product of claim 10 further comprising instructions for:
    associating the second filter input with the received email;
    propagating the second filter input to the at least another of the plurality of recipients of the received email and
    embedding the aggregated first and second filter inputs within the header of the modified received email.

15. The computer program product of claim 10, further comprising instructions for:
    preventing other emails from being accessed within an inbox associated with each of the plurality of recipients until the modified received email has been opened.

16. A computing system comprising:
    a processor;
    a memory architecture coupled with the processor;
    one or more software modules executed on the processor and the memory architecture, wherein the one or more software modules are configured to cause the processor to perform operations including:

receiving a first filter input from a first recipient of a received email including a plurality of recipients, the first filter input corresponding to the received email;

associating the first filter input with the received email, wherein the first filter input includes a characterization of the received email;

propogating the characterization of the received email of the first filter input to at least another of the plurality of recipients of the received email;

modifying the received email based upon, at least in part, the first filter input, including embedding the first filter input within a header of the modified received email;

receiving a second filter input from a second recipient of the received email; and aggregating the first filter input and the second filter input.

17. The computing system of claim 16, wherein the characterization of the received email of the first filter input is indicative of a perceived importance of the received email.

18. The computing system of claim 16, wherein modifying the received email based upon, at least in part, the first filter input further includes at least one of:

modifying the received email based upon a status of the first recipient; and modifying the received email based upon one or more rules defined for the at least another of the plurality of recipients.

19. The computing system of claim 16 further comprising:

associating the second filter input with the received email;

propagating the second filter input to the at least another of the plurality of recipients of the received email; and embedding the aggregated first and second filter inputs within the header of the modified received email.

20. The computing system of claim 16, further comprising:

preventing other emails from being accessed within an inbox associated with each of the plurality of recipients until the modified received email has been opened.

* * * * *